April 18, 1939.  M. T. WESTON  2,154,648
RESILIENT DRIVING CHAIN
Filed March 29, 1937
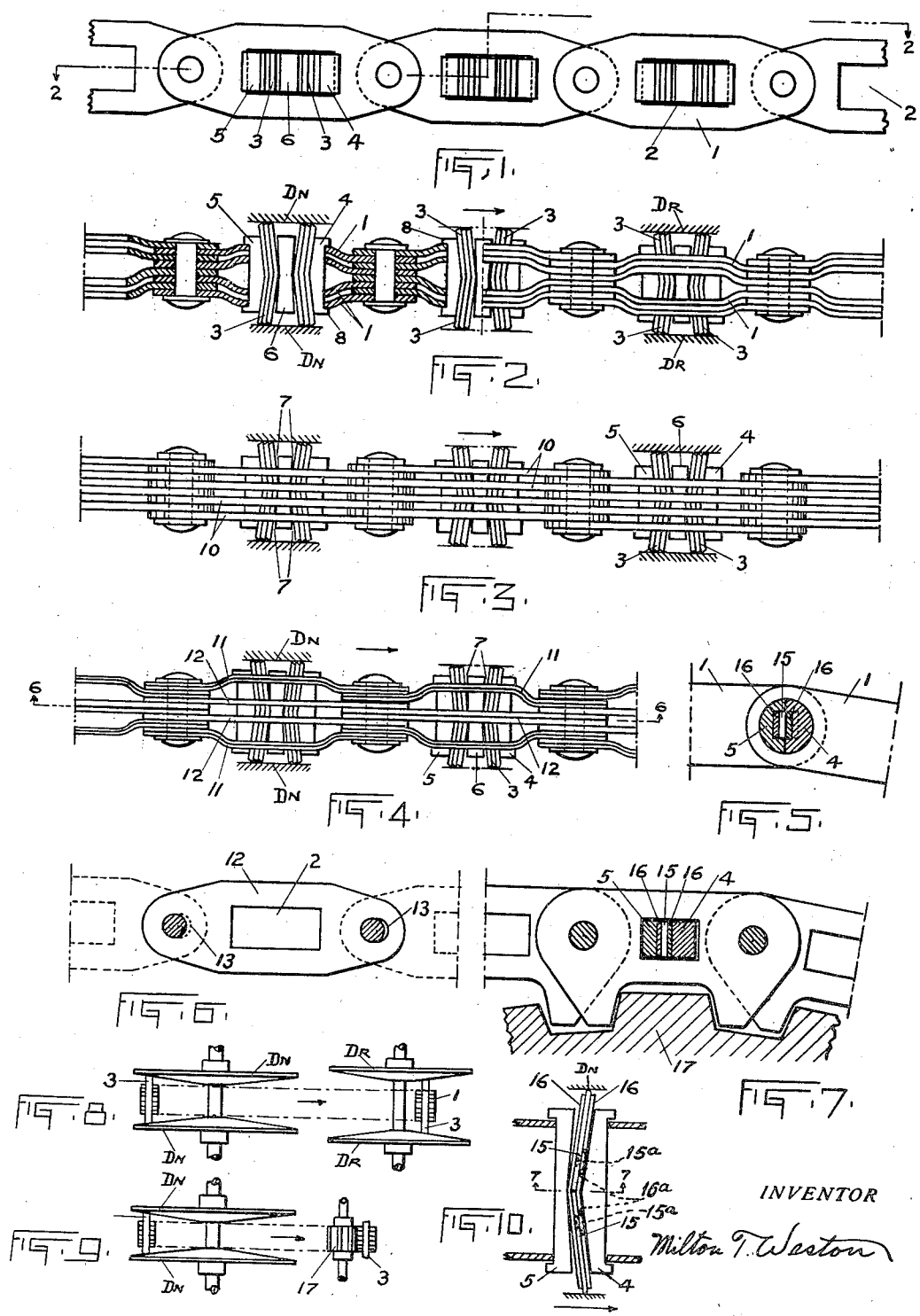
INVENTOR
Milton T. Weston Patented Apr. 18, 1939

2,154,648

UNITED STATES PATENT OFFICE 2,154,648

RESILIENT DRIVING CHAIN

Milton T. Weston, Red Bank, N. J.

Application March 29, 1937, Serial No. 133,553

4 Claims. (Cl. 74—236)

My invention relates to improvements in resilient driving chains wherein the individual links elongate under stress and return to normal when the stress is removed and wherein the driving elements comprise a plurality of slightly flexed transverse end-contacting members which are capable of flexing under stress and which co-operate with plain tapered driving and driven discs of either the fixed or adjustable type. An important feature of my invention contemplates the use of non-resilient links in conjunction with the resilient links in order to establish an initial tension in the resilient links and at the same time limit the amount of stress to which they may be subjected.

The principal object of my invention is to provide a metallic resilient chain which may be enclosed to run in oil and which will require the minimum of attention and maintenance and which will have the same resilience under stress as leather, fabric and rubber belts. Other objects will appear in the following specifications and are shown in the accompanying drawing in which similar reference numerals refer to like parts in all of the views.

Fig. 1 is a side elevation of my resilient chain.

Fig. 2 is a partial sectional and partial plan view of my invention and is taken on a line 2—2 of Fig. 1.

Fig. 3 is a plan view of another form of my invention wherein the links are all of the non-resilient type.

Fig. 4 is a plan view showing the combination of resilient and non-resilient links.

Fig. 5 is a sectional view showing a transverse driving element mounted in the pivotal joint of the chain.

Fig. 6 is a partial side view of Fig. 4.

Fig. 7 shows one of the single type driving elements mounted in a link of the present type of silient driving chain.

Fig. 8 is a plan view showing the application of my resilient driving chain to driving and driven plain tapered discs.

Fig. 9 is a plan view showing the application of the adaptation of my invention, as in Fig. 7, to a pair of driven tapered discs and a driving silent sprocket wheel.

Fig. 10 is an enlarged view of a single transverse driving element with modification.

The preferred form of my invention is shown in Figs. 1 and 2 wherein the driving chain is composed of a plurality of deformed links 1, preferably made of spring steel but which may be made of other metals or alloys to meet any special requirement. These links are so designed as to elongate under stress and will return to normal when the stress is removed. The extent of the elongation will, of course, be in proportion to the stress and will be relatively small in each link but the cumulative elongation of a complete driving chain will be relatively large. The number of links employed in parallel will depend upon the working stress to which the chain will be subjected. Each link 1 has an opening 2 approximately midway between the pivotal joints of the chain and when assembled in the chain a transverse opening is formed through the assembled links in which I mount transverse driving elements comprising a plurality of slightly flexed members 3 and co-operating retainers 4 and 5 respectively forward and rearward of the flexed members 3 and a central retainer 6 located between the two groups of flexed members 3. The central retainer 6, being somewhat double wedge-shaped with the apices toward the center, can not readily be moved endwise in either direction and thus it automatically maintains substantially its central position. It will be noted in Figs. 2, 3 and 4 that I show two groups of flexed members 3 in each driving element, one group being flexed forward in the direction of the travel of the chain as indicated by the arrow and the other group is flexed rearward. The forward retainer 4 and the rearward retainer 5 conform to the shape of the flexed members 3. The central retainer 6 is just of sufficient thickness at the center to make up the required thickness of the driving element but is somewhat narrower at each end than the distance between the two sets of flexed members 3 so as not to completely fill the space between them. This leaves a relatively small tapering space 7 on each side of the central retainer 6 which will allow a slight flexing movement of both ends of each group of flexed members 3 toward the transverse center line of the driving element but not sufficient to allow the members 3 to become straight. The reason for this will appear herein later. The forward retainer 4, the rearward retainer 5, the central retainer 6 and the flexed members 3 are all assembled and then placed in position in the transverse openings 2 in the links 1 of the chain and both ends of the retainers 4 and 5 are turned over slightly at 8 to secure the driving element in place.

In Fig. 3 I show the transverse driving elements mounted in a chain of the usual non-resilient type. The links 10 not being deformed will not elongate under stress. Otherwise the chain functions the same as the type shown in Fig. 2.

Figs. 4 and 6 illustrate a combination of the two types shown in Figs. 2 and 3. In these views I show the deformed links 11 made up of a series of laminations which, it will be understood, are more flexible than a single link of the same total thickness. In the center of the chain are placed a series of straight links 12 like those in Fig. 3 except that I show one of the pivot eyes in each link slotted at 13. These straight non-resilient links 12 perform a double function. They make it possible to assemble the chain so that it will have an initial tension which may equal the driving stress or any other stress desired. This is accomplished by making the normal distance between the pivot eyes in the deformed links 11, a little less than the shortest distance between the pivot eyes in the straight links 12 so that it will be necessary to stretch or elongate the deformed links 11 in order that the pivots may be put thru the eyes of all of the links in assembling. The stretching or elongating of all of the deformed links in this manner in assembling the chain gives it the initial tension above referred to. The chain will then elongate only in case of an overload or shock which exceeds this initial tension. The second function of the straight links 12 is to limit the overload which may be thrown on the resilient links 11 by limiting the elongation of these resilient links to the amount the pivot eyes 13 are slotted. When the chain has elongated to the extent allowed by the slotted pivot eyes 13, it will run as a non-resilient chain like Fig. 3. It will also run as a non-resilient chain when the driving stress is less than the initial stress in the several resilient links 11. Therefore the resilience under these circumstances will come into play only in case of overloads, severe shocks etc. which cause injury to the present type of non-resilient chain and limit their useful life.

In Fig. 5 I show the single type of transverse driving element, illustrated in Fig. 10, in the joint of the chain where it performs the additional function of a pivot. In this case the forward retainer 4 and rearward retainer 5 are circular on the outside and when assembled with the flexed members 3, make a complete pin for the chain. This construction will be satisfactory for slow running chains.

In Fig. 7 I show a method of applying the single type of transverse driving element, illustrated in Fig. 10, to the present type of silent sprocket chain. This is done by increasing the pitch of the chain sufficiently to allow the mounting of the transverse driving element in the body of the links as shown. The cross section of the driving element is on a line 7—7 of Fig. 10.

Fig. 10 shows the single type of transverse driving element and is substantially the forward part of the double type previously described and shown in Figs. 2, 3 and 4. When this type is used the chain will operate only in one direction while the double type operates in either direction. In Fig. 10 however, I show a slight modification in the flexed members as follows. A central driving member 15 is made in two parts which abut each other at the center. They are yieldingly held in place by forward and rearward flexed bars 16 which are somewhat shorter than the combined length of the two parts of the driving member 15 and act as retainers for it. In this construction each member of the central driving element 15 is sufficiently heavy so as not to buckle under the end stresses imposed. The central opposed driving members 15 have relatively small extrusions 15a, located on the horizontal center line of the members, which engage corresponding openings 16a shown in the forward bar 16 and are thus held against endwise displacement when not engaging the discs Dn. In the double type I show a plurality of lighter members, the combined strength of which is sufficient to prevent buckling. However, the type of driving element shown in Fig. 10 may be used in the double type as well.

The action of the transverse driving members and the operation of my invention in practice are as follows. The chains illustrated in Figs. 1 thru 6 are designed to operate in conjunction with driving and driven plain tapered discs which may be either the fixed type represented by the common multi-V groove sheaves or the adjustable type illustrated in Fig. 8. The combination chain shown in Fig. 7 is designed to operate over a silent chain sprocket wheel 17 and plain tapered discs Dn as illustrated in Fig. 9. In the arrangement shown the silent chain sprocket are moved along with them progressively. This being driven.

The action of the transverse driving elements can best be described by referring to Fig. 2. We will regard the shaded lines Dn, which contact the ends of the driving elements, as the lines of contact on the surfaces of the driven discs and the shaded lines Dr as the lines of conduct on the surfaces of the driving discs. It will be noted that the forward group of flexed members 3 in contact with the driving discs Dr are flexed forward in the direction of travel of the chain and away from the direction of the force or power delivered by the driving discs Dr and therefore have only frictional contact with them. The rearward group is flexed in the opposite direction and opposes the force delivered by the driving discs Dr which they contact at very steep angles approaching a perpendicular with respect to the driving surfaces Dr but as previously described the construction of the driving element prevents the flexed members 3 from becoming straight. They may straighten only as much as represented by the spaces 7. On account of the very steep angle at which the flexed members contact the driving surfaces Dr the flexed members 3 jam between the two driving surfaces and are moved along with them progressively. This action obviously will carry the chain along with them. At the driven discs Dn the action is just the reverse. The chain does the pulling and the forward group of flexed members 3 come progressively into action and jam between the two driven discs Dn to drive them, while the rearward group of bars have only frictional contact.

The foregoing explains the use of the double acting driving elements in Figs. 1 thru 4 and as illustrated in Fig. 8. Since the combination chain shown in Fig. 7 is driven by a sprocket wheel, only single acting driving elements similar to that shown in Fig. 10 will be required. In the several views I show the contacting ends of the flexed members 3 and 15 somewhat reduced in area by bevelling or chamfering the end edges so as to readily cut thru the oil film on the surfaces of the discs. Any relatively large surface would not break thru the oil film and could therefore offer only a limited frictional resistance.

From the foregoing it will be clear that my chain does not depend upon frictional resistance at the points of contact with the driving and driven discs but upon a positive action caused by the progressive jamming of a relatively large number of slightly flexed transverse end-contacting members between the co-operating plain surfaces of tapered driving and driven discs. It is obvious that straight bars could not have this jamming or crowding action and therefore would offer only relatively slight frictional resistance and would slip on the driving and driven discs under stress. The chain in applicant's device will not slip unless some of the parts fail. The resilient feature of applicant's chain is not possible in ordinary chains of fixed pitch such as those that run on sprocket wheels. Applicant's chain does not require a fixed pitch and can run on an infinite number of pitch diameters which makes the resilient feature not only possible but entirely practical.

Having thus described my invention I claim as broadly new and desire to secure by Letters Patent:

1. A power transmitting member for a power transmitting chain adapted to operate on opposed plain tapered discs said power transmitting member comprising in combination flexed load-transmitting bars and oppositely flexed load-receiving bars all of said bars being capable of flexing and adapted to endwise contact the plain faces of said opposed tapered discs and to be moved into jammed relation therewith, a retaining cage for all of said flexed bars said retaining cage being adapted for transverse mounting in said chain and having interior means for positioning all of said bars in flexed relation to a straight line transverse to said chain, and a spacing member between said flexed load-transmitting and load-receiving bars to operably position same in said retaining cage and to limit the flexing thereof.

2. A power transmitting member for a power transmitting chain adapted to operate on opposed plain tapered discs said power transmitting member comprising in combination a plurality of bars transverse to said chain said bars being flexed with respect to a straight line transverse to said chain and adapted to endwise contact the plain faces of said opposed tapered discs in the plane of travel of said chain and to be moved into jammed relation therewith the ends of said bars being reduced in area with respect to their normal cross sectional area, and a retaining cage for said bars said cage being adapted for transverse mounting in said chain and having interior means adapted to maintain said bars in flexed relation to a straight line transverse of said chain.

3. A power transmitting member for a power transmitting chain said power transmitting member being adapted to operate on the plain faces of opposed tapered discs and comprising in combination a plurality of flexible elements positioned in said chain in flexed relation to a straight line transverse to said chain to endwise contact the plain faces of said tapered discs and to be moved into jammed relation therewith in the direction of travel of said chain, and retaining means for said flexible elements said retaining means being adapted for transverse mounting in said chain and having interior means conforming to the flexed positions of said flexible elements whereby the latter are maintained in their operating flexed positions transverse to said chain.

4. A power transmitting member for a power transmitting chain adapted to operate on opposed plane tapered discs said power transmitting member comprising plural groups of laminated flexed elements, one of said groups being flexed rearward with respect to the direction of travel of said chain to transmit power thereto and the other group being flexed forward to transmit power therefrom all of said flexed elements being positioned transversely in said chain and endwise contacting the plain faces of said opposed tapered discs and adapted to be moved into jammed relation therewith in the direction of travel of said chain, and a retaining cage for both groups of said flexed elements said retaining cage being adapted for transverse mounting in said chain and having interior means conforming to said flexed elements and adapted to maintain both groups of flexed elements in their relative flexed operating positions.

MILTON T. WESTON.